(12) United States Patent
Kapaan et al.

(10) Patent No.: US 6,689,000 B1
(45) Date of Patent: Feb. 10, 2004

(54) PULLEY SET FOR A CONTINUOUSLY VARIABLE TRANSMISSION UNIT

(75) Inventors: Hendrikus Jan Kapaan, Nieuwegein (NL); Johannes Albertus Van Winden, Heidelberg (DE); Eduardus Gerardus Maria Holweg, Delft (NL); Bernardus Gerardus Van Leeuwen, Nieuwegein (NL)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 09/936,714

(22) PCT Filed: Apr. 6, 2000

(86) PCT No.: PCT/NL00/00226
§ 371 (c)(1),
(2), (4) Date: Sep. 17, 2001

(87) PCT Pub. No.: WO00/60256
PCT Pub. Date: Oct. 12, 2000

(30) Foreign Application Priority Data

Apr. 6, 1999 (NL) .............................................. 1011732

(51) Int. Cl.$^7$ .............................................. F16H 59/00
(52) U.S. Cl. ........................................ 474/20; 475/210
(58) Field of Search ................................. 474/8, 20, 21, 474/25, 41, 49, 69, 71, 72, 126; 475/149, 210, 302

(56) References Cited

U.S. PATENT DOCUMENTS 1,881,028 A * 10/1932 Meyer .......................... 474/41
3,375,738 A * 4/1968 Love ........................... 475/210
4,541,821 A   9/1985 Sakakibara
4,735,598 A * 4/1988 Moroto et al. ................. 474/29
5,057,061 A * 10/1991 Sakakibara et al. ......... 475/210
5,194,049 A * 3/1993 Knop, Jr. ...................... 474/69
5,378,198 A * 1/1995 Moroto et al. ................. 474/8
5,632,703 A * 5/1997 Wilkes et al. ............... 475/211

FOREIGN PATENT DOCUMENTS

| DE | 197 01 859 A1 | 10/1998 | | |
| EP | 0 582 307 A1 | 2/1994 | | |
| EP | 0 738 846 A2 | 10/1996 | | |
| FR | 2 253 954 A | 7/1975 | | |
| GB | 237353 | * 7/1925 | .................. 474/41 |
| JP | 59-197652 | * 11/1984 | .................. 474/13 |

* cited by examiner

*Primary Examiner*—Thomas R. Hannon
*Assistant Examiner*—Vicky A. Johnson
(74) *Attorney, Agent, or Firm*—Oliff & Berridge, PLC

(57) ABSTRACT

A pulley set for a continuously variable transmission unit, comprises a pair of discs accommodated on a shaft, and a screw mechanism which is concentric with respect to said discs and for moving the discs towards and from each other, said discs enclosing a V-shaped groove, for accommodating a belt, said screw mechanism being controllable by a control means. The control means including a motor unit, said motor unit comprising a stator and a rotor, one of said stator and rotor engaging the nut of the screw mechanism, and the other of said stator and rotor engaging the screw of the screw mechanism.

20 Claims, 2 Drawing Sheets

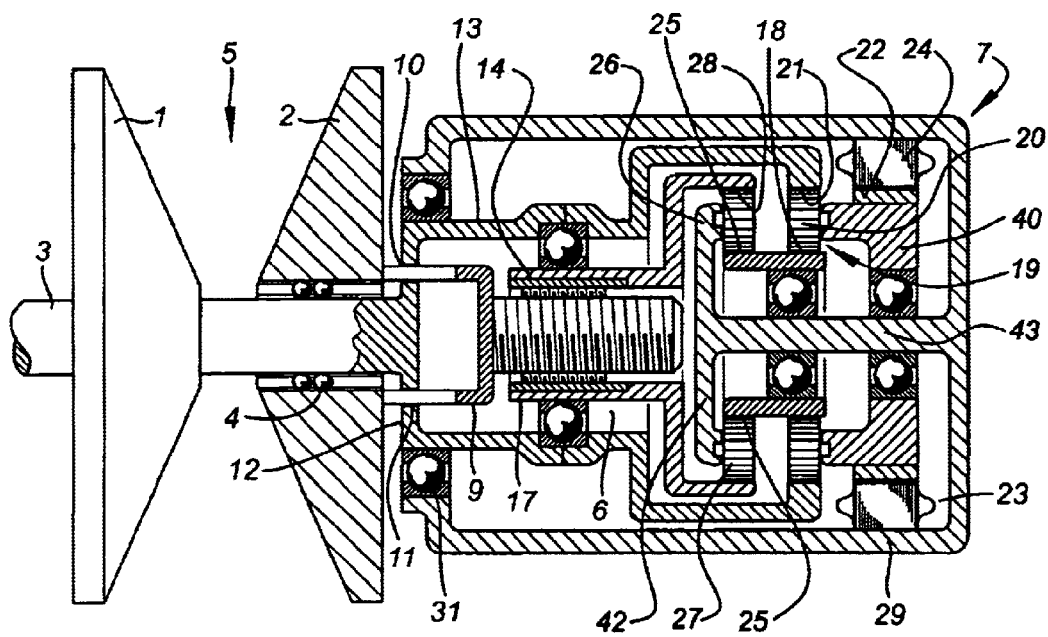
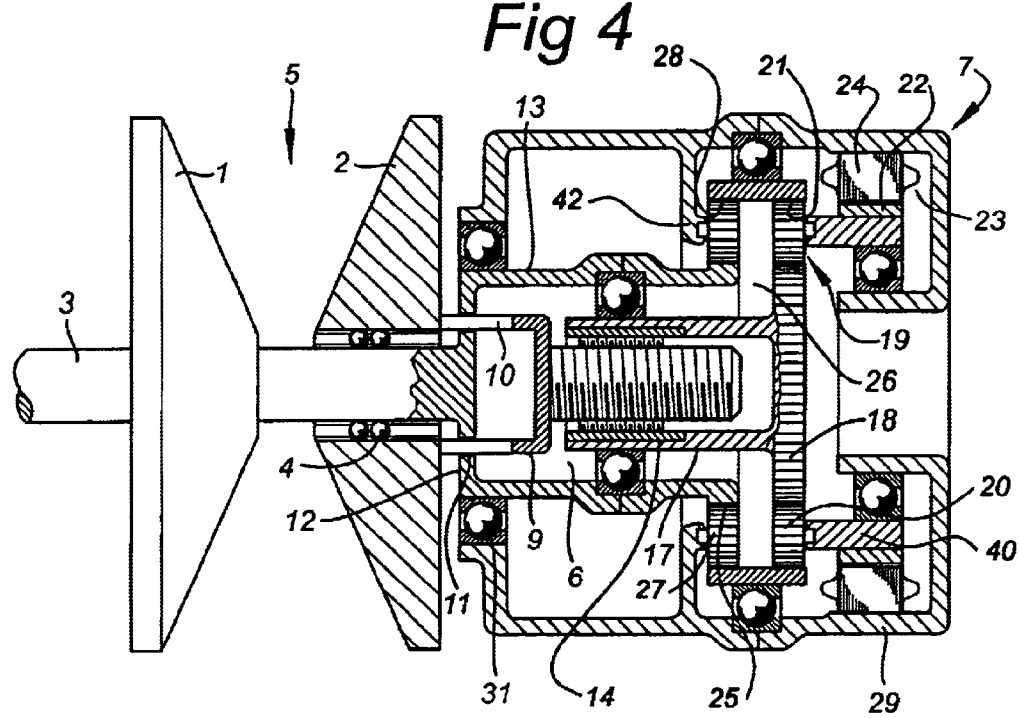

PULLEY SET FOR A CONTINUOUSLY VARIABLE TRANSMISSION UNIT

BACKGROUND OF THE INVENTION

1. Field of Invention

The invention is related to a pulley set for a continuously variable transmission unit, comprising a pair of discs accommodated on a shaft, and a screw mechanism which is concentric with respect to said discs and for moving the discs towards and from each other, said discs enclosing a V-shaped groove, for accommodating a belt, said screw mechanism being controllable by a controller, wherein said controller includes a motor unit, said motor unit including a stator and a rotor, one of said stator and rotor engaging the nut of the screw mechanism, and the other of said stator and rotor engaging the screw of the screw mechanism, the controller having two linked satellite gear wheel systems, one of which connects the rotor or the stator to the nut, and the other of which connects the other of said rotor or the stator to the nut, and the other of which connects the other of said rotor or stator to the screw, said satellite gear wheel systems each comprising a ring gear wheel, a sun gear wheel and satellite gear wheels.

2. Description of Related Art

A continuously variable transmission having such pulley sets is known from EP A 582307. The screw mechanisms of the pulley sets are controlled by a common, single motor, which is offset with respect to said screw mechanisms. The motor engages the screw mechanism through a number of intermediate gear wheels and auxiliary shafts.

As a result, this prior art continuously variable transmission unit is complicated, and therefore prone to malfunction. Moreover, its overall dimensions are rather large.

SUMMARY OF THE INVENTION

The object of the invention is to provide a pulley set for a continuously variable transmission, which does not have these disadvantages. This object is achieved in that the sun gear wheels or the ring gear wheels are fixedly connected together.

The pulley set according to the invention may have its own motor unit. This allows a rapid and independent control of the gap of the pulley set. As a result, the pinching force exerted by the discs on the belt can be regulated as required, in particular in order to avoid slip. Also, a rapid transmission ratio change is made possible.

In case the screw mechanism is static in relation to the nut, the screw mechanism and the nut have the same rotational speed. The transmission ratio is then constant, and the motor keeps the screw mechanism, and thus the discs of the pulley set, in a static position. That is, the discs enclose a gap which remains of constant width.

Upon a relative rotation between the rotor and the stator of each motor, a change in said gap is generated due to the action of the screw mechanism.

The required reduction between the motor and screw mechanism is preferably obtained by means of at least one satellite gear wheel system. For instance, each controller may comprise two linked satellite gear wheel systems, one of which connects the rotor or the stator to the nut, and the other of which connects the other of said rotor or stator the screw, said satellite gear wheel systems each including a ring gear wheel, a sun gear wheel and satellite gear wheels.

The pulley set having two linked satellite gear wheel systems may be carried out in several ways.

According to a first embodiment, the ring gear wheels are connected to the stator respectively to the rotor, and the sun gear wheels are connected to each other.

According to a second embodiment, the sun gear wheels are connected to the stator respectively to the rotor, and the ring gear wheels are connected to each other.

According to a third embodiment, the satellite gear wheels of each satellite gear wheel system are accommodated on a respective carrier, said carriers being connected to the stator respectively to the rotor, and the sun gear wheels are connected to each other.

According to the fourth embodiment, the satellite gear wheels of each satellite gear wheel system are accommodated on a carrier, said carrier being connected to the stator respectively to the rotor, and the ring gear wheels are connected to each other.

The gear ratios of the satellite gear wheel systems should be identical.

Preferably, the satellite gear wheel systems are coaxial and have coaxial ring gear wheels and coaxial sun gear wheels.

The diameters of the ring gear wheels can be identical. Also, the diameters of the sun gear wheels can be identical, and the diameters of the satellite gear wheels can be identical.

The sun gear wheel of a satellite gear wheel system may be connected to the shaft, and the ring gear wheel of a satellite gear wheel system may be connected to the shaft. Also, the carriers for the satellite gear wheels may be connected to the shaft.

Preferably, an electric motor is applied in the controller, which may be concentric with relation to the pulley set.

The invention also relates to a continuously variable transmission including two pulley sets as described before and an endless belt stretching between said sets and accommodated in the grooves thereof.

BRIEF DESCRIPTION OF THE DRAWINGS

FIGS. 1–4 shows embodiments of the pulley set according to the invention.

DETAILED DESCRIPTION OF PREFERRED EMBODIMENTS

The invention will be explained further with reference to the embodiment of the pulley sets shown in the figures.

Figure 1:
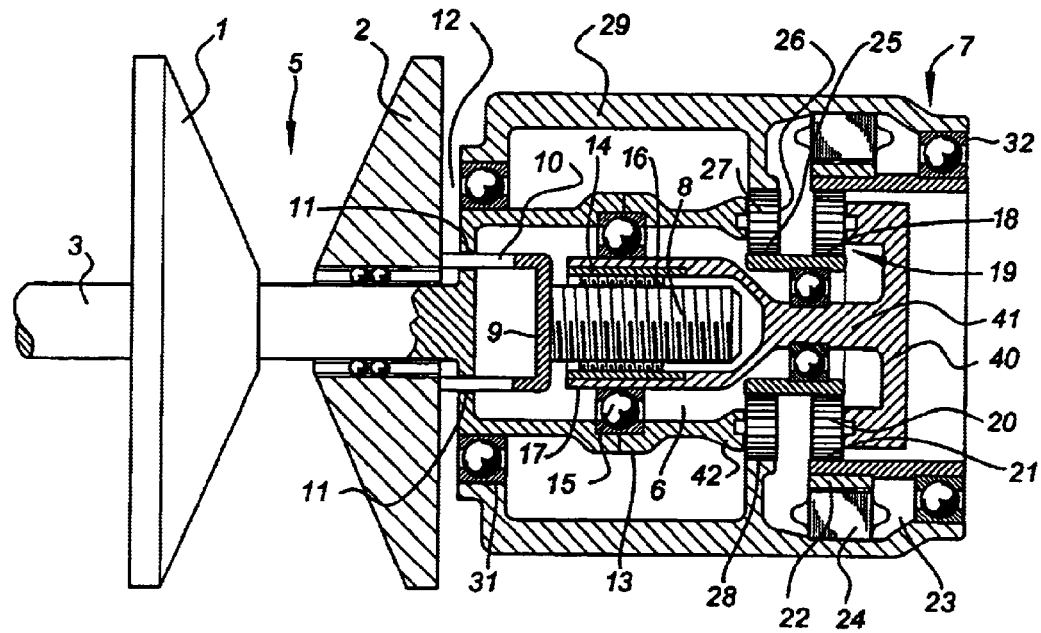

The pulley set in FIG. 1 comprises two discs 1, 2, mounted on a shaft 3. In the embodiment shown, disc 1 is fixedly connected to shaft 3, whereas disc 2 is slidably, but non-rotatably through groove/ball connection 4, accommodated on the shaft 3.

The discs 1, 2 enclose a V-shaped groove 5, the width of which can be varied upon shifting the slidable disc 2. The V-shaped groove 5 accommodates a belt 50, such as an endless belt, a flexible toothed belt, a chain drive, a direct gear transmission, pull belt or push belt.

To that end, the discs 1, 2 are connected to a screw mechanism 6, the action of which is controllable by means of controller 7. In particular, the screw 8 of the screw mechanism 6 is connected to slidable disc 2 by means of a yoke 9. This yoke 9 has legs 10 which protrude through holes 11 which are arranged in the wall 12 of screw mechanism housing 13 which accommodates the screw mechanism 6.

The screw mechanism housing 13 is connected to the support shaft 3 and thereby to the fixed disc 1. Within the screw mechanism housing 13, the nut 14 of the screw mechanism 6 is rotatably fixed in axial direction, supported by means of bearing 15. The nut 14 and the screw 8 engage each other through grooved rollers 16. Alternatively, balls may be applied instead of grooved rollers.

According to the invention, the nut 14 is accommodated in a sleeve 17, which is connected through a carrier 40 and shaft 41 to the first satellite gear wheels 20.

These satellite gear wheels 20 form part of a first satellite gear wheel system 19, which further include a first sun wheel 18, a ring gear wheel 21, and a number of satellite gear wheels 20 mounted rotatably on the carrier 40. In turn, the ring gear wheel 21 is connected to the rotor of electric motor 23, which electric motor 23 furthermore comprises a stator 24.

The screw mechanism housing 13 is connected to the second satellite gear wheels 27, which form part of a second satellite gear wheel system 26. This second gear wheel system 26 further includes a second sun gear wheel 25, as well as a second ring gear wheel 28. This second ring gear wheel 28 is connected to the first ring gear wheel 21.

The screw mechanism housing 13 is rotatably supported with respect to the stator housing 29 by a bearing 31. Furthermore, the ring gear wheel 21 is rotatably supported with respect to the stator housing 29 through a bearing 32.

In service of the pulley set in a continuously variable transmission unit, and in the case of a constant width of the V-shaped groove 5, the screw mechanism housing 13 rotates at the same rotational speed as the shaft 3, the motor housing 29 is stationary. The motor 23 acts to as to keep the nut 14 and the screw 8 in a fixed relative position, by making the rotor 22 stand still.

Upon changing the width of the groove 5 however, the motor 23 is activated in such a way that the rotor 22 is rotated with respect to the stator 24. As a result, the satellite gear wheels 20, 27 make the sun gear wheel 18 rotate with respect to the sun gear wheel 25, whereby the nut 14 is rotated with respect to the screw. The screw mechanism 13 thus makes the disc 2 move towards or from fixed disc 1.

Figure 2:
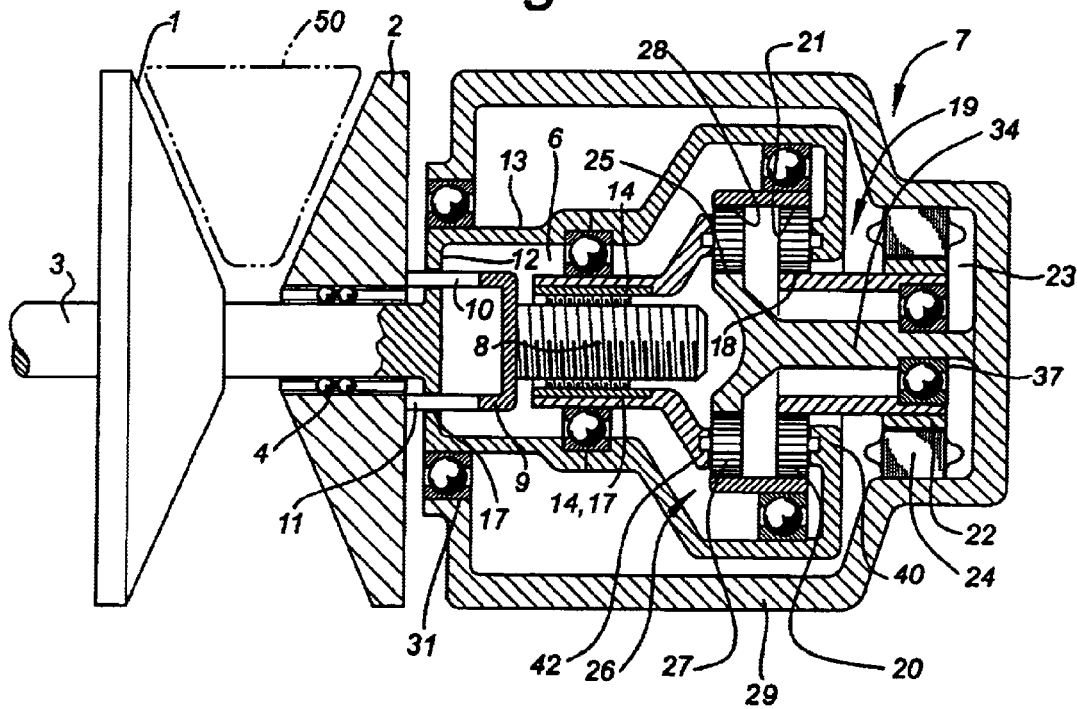

The embodiment of FIG. 2 to some extent corresponds to the embodiment of FIG. 3. However, the rotor 22 now is connected to the sun wheel 18 of the first satellite gear wheel system 33. The ring gear wheel 21 and the sun gear wheel 18 engage each other by means of the first satellite gear wheels 20.

The ring gear wheel 21 of this first system 33 is connected to the second ring gear wheel 28 of the second satellite gear wheel system 26. The sun gear wheel 18 of the first satellite gear wheel system 33 is supported with respect to the axle stub shaft by means of bearing 37. The second sun gear wheel 25 of the second satellite gear wheel system 26 is connected to the motor housing 29 through an axle stub 34. The sun gear wheel 25 and the ring gear wheel 28 of the second system 26 engage each other through the second satellite gear wheels 27. Screw mechanism housing 13 is rotatably supported with respect to stator housing 29, by bearing 31.

In the embodiment of FIG. 3 the carrier 40 of the satellite gear wheels 20 of the first satellite gear wheel system 19 is connected to the rotor 22 of the motor 23. The carrier 42 of the satellite gear wheels 27 through shaft 43 is connected to the stator 22 of said motor 23.

The sun gear wheels 18, 25 are interconnected, whereas ring gear wheel 21 engages the screw 8 through the screw mechanism housing 13 and the yoke 9, and ring gear wheel 28 engages the nut 14 with sleeve 17.

In the embodiment of FIG. 4, the outer rings 21, 28 are interconnected. The carrier 40, 42 are connected to the rotor 24 respectively to the stator 22. The sun gear wheels 18, 25 are connected to the nut 14 with sleeve 17, respectively to the screw 18 through the screw mechanism housing 13 and the yoke 9.

Although in the embodiments shown one of the pulley discs is fixed and one pully disc is slidable with relation to the shaft, the invention is also related to pulley sets wherein both polley discs are slidable with relation to the shaft (symmetrical movement).

What is claimed is:

1. Pulley set for a continuously variable transmission unit, comprising:

a pair of discs accommodated on a shaft, and a screw mechanism which is concentric with respect to said discs and for moving the discs towards and from each other, said discs enclosing a V-shaped groove, for accommodating a belt, said screw mechanism being controllable by a control means, wherein said control means includes a motor unit including a stator and a rotor, one of said stator and rotor connected to a nut of the screw mechanism, and the other of said stator and rotor connected to the screw of the screw mechanism, the control means comprising two linked satellite gear wheel systems, one of which connects the rotor or the stator to the nut, and the other of which connects the other of said rotor or stator to the screw, said satellite gear wheel systems each comprising a ring gear wheel, a sun gear wheel and satellite gear wheels, characterised in that the sun gear wheels or the ring gear wheels are fixedly connected together.

2. Pulley set according to claim 1, wherein the satellite gear wheels of each satellite gear wheel system are accommodated on a respective carrier, said carriers being connected to the rotor and stator respectively and the sun gear wheels are connected to each other.

3. Pulley set according to claim 1, wherein the satellite gear wheels of each satellite gear wheel system are accommodated on a carrier, said carriers being connected to the rotor respectively to the stator, and the ring gear wheels are connected to each other.

4. Pulley set according to claim 1, wherein the gear ratios of the satellite gear wheel systems are identical.

5. Pulley set according to claim 1, wherein the satellite gear wheel systems are coaxial and have coaxial ring gear wheels and coaxial sun gearwheels.

6. Pulley set according to claim 1, wherein both satellite gear wheel systems are driveable by a common motor.

7. Pulley set according to claim 1, wherein each satellite gear wheel system is driveable by means of a coaxial motor.

8. Pulley set according to claim 1, wherein the diameters of the ring gear wheels are identical.

9. Pulley set according to claim 1, wherein the diameters of the sun gear wheels are identical.

10. Pulley set according to claim 1, wherein the diameters of the satellite gear wheels are identical.

11. Pulley set according to claim 1, wherein the sun gear wheel of a satellite gear wheel system is connected to the shaft.

12. Pulley set according to claim 1, wherein the ring gear wheel of a satellite gear wheel system is connected to the shaft.

13. Pulley set according to claim 1, wherein the satellite gear wheels of a satellite gear wheel system are connected to the shaft.

14. Pulley set according to claim 1, wherein one of the discs is fixed on the shaft, and the other disc is slidable with respect to the shaft and fixed to the screw.

15. Pulley set according to claim 1, wherein the motor is an electric motor.

16. Continuously variable transmission, comprising: at least one pulley set, one of which being a pulley set according to claim 1, and an endless belt stretching between said sets and accommodated in the grooves thereof.

17. Continuously variable transmission according to claim 16, wherein the at least one pulley set is connected to a single motor unit.

18. Pulley set according to any of claims 4–17, wherein the sun gear wheel (25) of a satellite gear wheel system (26) is connected to the shaft (3).

19. Continuously variable transmission according to claim 16, wherein the endless belt is a pull belt.

20. Continuously variable transmission according to claim 16, wherein the endless belt is a push belt.

* * * * *